Jan. 19, 1926.  1,569,989
A. H. LEIPERT
UNIVERSAL JOINT
Filed June 19, 1923   2 Sheets-Sheet 1

INVENTOR
August H. Leipert
BY
Redding, Greeley, Shea & Campbell
ATTORNEYS

Jan. 19, 1926.  1,569,989
A. H. LEIPERT
UNIVERSAL JOINT
Filed June 19, 1923   2 Sheets-Sheet 2
Fig. 4.
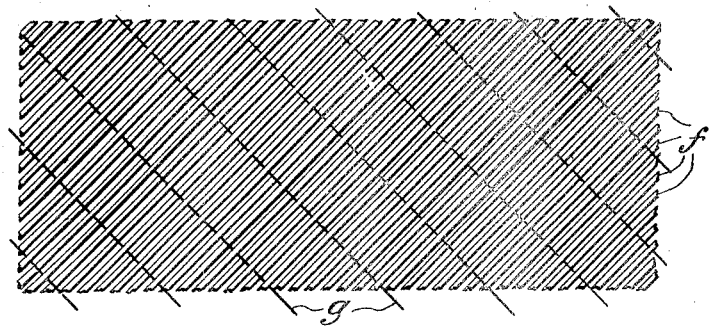
Fig. 5.   Fig. 6.
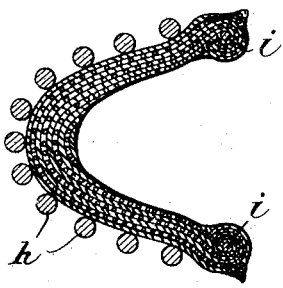 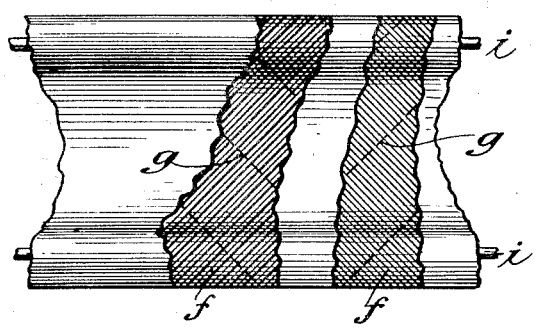
Fig. 7.
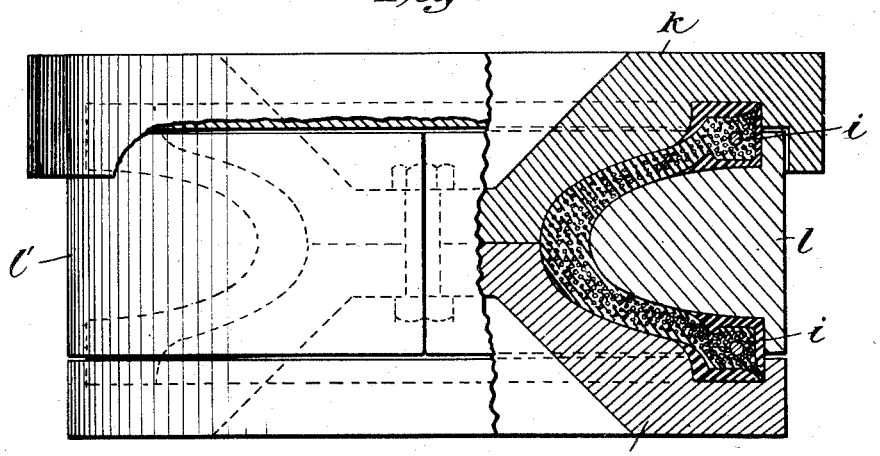
INVENTOR
August H. Leipert
BY
Redding Greeley O'Shea & Campbell
ATTORNEYS Patented Jan. 19, 1926.

1,569,989

UNITED STATES PATENT OFFICE.

AUGUST H. LEIPERT, OF NEW YORK, N. Y., ASSIGNOR TO INTERNATIONAL MOTOR COMPANY, OF NEW YORK, N. Y., A CORPORATION OF DELAWARE.

UNIVERSAL JOINT.

Application filed June 19, 1923. Serial No. 646,329.

*To all whom it may concern:*

Be it known that I, AUGUST H. LEIPERT, a citizen of the United States, residing in the borough of Queens, of the city of New York, in the State of New York, have invented certain new and useful Improvements in Universal Joints, of which the following is a specification, reference being had to the accompanying drawings, forming a part hereof.

In Letters Patent of the United States No. 1,414,411 there is disclosed a universal joint having straight cords which transmit the driving forces in either direction of rotation. These cords are carried in a suitable flexible casing. The present invention relates to the same type of universal joint that is concerned more particularly with practical methods of manufacturing the same.

It is the principal object of the present invention to provide manufacturing methods for laying up cords on a hyperboloid of revolution and mould them into a flexible casing such as rubber and vulcanizing the unit thus formed in accordance with such steps as will insure the provision of a joint of proper mechanical strength and flexibility and one which will transmit the driving forces in accordance with the principle disclosed in the aforementioned patent. The cords employed are either wound within a mould so as to assume proper relative positions for transmission of the driving forces along straight lines and sheets of rubber are laid into the mould in such relation to the cords as to wholly embed them upon vulcanization, or, cord fabric is cut on the bias in sheets and laid into the mould with rubber, certain of the layers of cord fabric having the strands extending in one direction and other layers having the strands extending in the opposite directions so as to take care of both directions of rotation. The rubber employed may itself be of different properties at different parts of the hyperboloid formed to take care of the different conditions to be met since, for instance, the greatest flexion is encountered at the center of the joint while the greatest mechanical stresses are imposed along the flanges formed for securing the joint to the driving and driven members. The properties of the rubber used are varied to facilitate the described actions.

Reference is now to be had to the accompanying drawings for an understanding of the improvements although it is to be understood that the drawings illustrate the devices employed only in schematic fashion and the invention is not to be limited to the precise form or design of those parts which best serve the purpose as known to a skilled rubber man. In the drawings:

Figure 4 illustrates a piece of fabric cloth which may be employed in place of the continuous winding illustrated in Figure 1.

Figure 1:
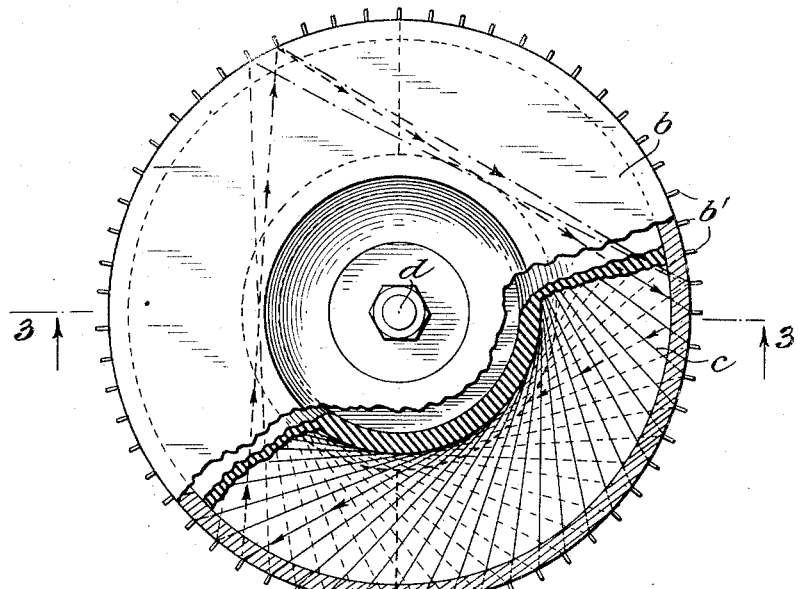
Figure 1 is a view in plan, with parts broken away, of a mould for practicing the improved method and showing particularly the general course followed by the crosscords.
Figure 2:
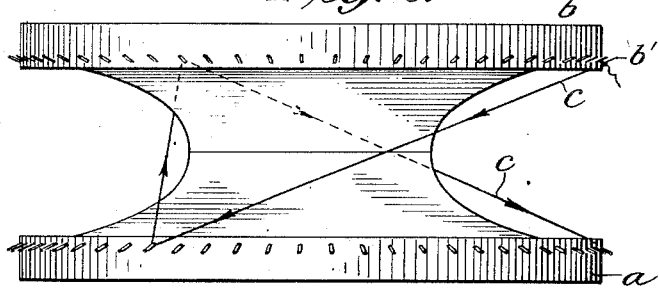
Figure 2 is a view in side elevation of the mould shown in Figure 1.
Figure 3:
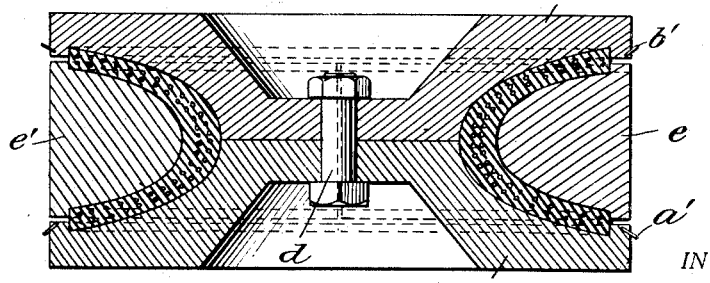
Figure 3 is a view in transverse section taken on the plane indicated by the line 3—3 of Figure 1 and looking in the direction of the arrows and showing the complete mould and the relation of the rubber and cords, as during vulcanization.

Figure 5 indicates a method of laying up sheets of fabric cloth with sheets of rubber in a mandrel before placing the unit in the mould.

Figure 6 is a view in elevation of a fragment of a joint after completion, parts being broken out to show the relation of the strands of the fabric cloth.

Figure 7 is a view partly in elevation and partly in vertical section of the complete mould for vulcanizing a joint built up with fabric cloth.

A central mould member composed generally of upper and lower halves $b$, $a$, may have in cross section the hyperbolic form desired in the finished universal joint and the sections thereof may carry for convenience pegs b', a', so disposed with respect to one another that a continuous cord winding indicated as c may be worked around the pegs and assume such tangential form with respect to the mould as to transmit, when in use, driving forces between the driving and driven members along straight lines in either direction of rotation. A bolt d may be employed to secure the two mould members together. Exterior semi-circular mould members e, e', serve to close the mould and hold the parts in proper relative position for vulcanization into a unitary structure, the interior cross sectional form of these members being such as is desired.

In the manufacture of a joint having continuous cord windings c such as illustrated sheets of rubber may be laid into the mould before the winding is commenced and additional sheets may be laid in in any desired relation to the strands as may seem necessary to one skilled in the art until the desired mass of rubber is brought in and around the cords. The mould members e, e', are then brought into place and vulcanization carried on. The finished product comprises a universal joint which may be coupled at its edges to driving and driven members for the purpose of transmitting driving forces therebetween in either direction of rotation along the straight cords c. The rubber permits flexing when the connected shafts assume relative angular positions. This flexing will in no case cause deflexion of any of the straight cords c, considered lengthwise, since such flexion will take place in the rubber along an axis coincident with one of such cords. If desired, the rubber laid in may have different properties at different points of the hyperboloid. For instance, the rubber near the edges where the joint is to be united mechanically with the driving and driven members may be tougher and harder while the rubber along the midsection where flexion occurs may be more in the nature of soft gum rubber.

One of the most important embodiments of the invention is illustrated in Figures 4–7 and this product is claimed hereinafter. So-called fabric cloth as illustrated in Figure 4 is comprised of relatively stout strands f disposed in parallelism and held together in sheets by cross threads g permitting the fabric to be handled and cut as desired. In accordance with the invention it is proposed to employ such a fabric sheet f and to cut it on the bias so that when the joint is built up the main strands f will be found to extend between the driving and driven members on such an angle as to transmit driving forces directly therebetween. To take care of rotation in both directions some of the fabric sheets are laid in with the strands f running in one direction and some of the fabric sheets are laid in with such strands running in opposite directions giving the characteristic cross cord effect. In manufacturing a joint with such fabric sheets f after the latter have been cut on the bias they may be laid in a form, a part of which is indicated in Figure 5 at h, and rubber in sheets may be laid in and around such fabric sheets until the desired bulk and number are in place. Circular metal beads i may serve to receive the sheets for over-lapping when transferred into the two-part mould k. Figure 6 indicates, where broken out, that some of the threads f run in one direction and threads in another sheet run in the opposite direction so that the finished joint transmits driving forces in both directions as required. Rubber of different properties may be employed at different parts of the joint for the purpose hereinbefore described. After being built up on a suitable mandrel the structure is laid in the mould k and the male mould members l, l', put in place and thereafter vulcanized. The beads i reenforce the flanges of the joint and give strength at the points where they are to be secured, respectively, to the driving and driven members.

As pointed out hereinbefore, the invention is not to be limited to the character of the equipment actually employed during the manufacture or to the particular relation of elements since such matters will always follow the best practice in the rubber art but it is intended that the appended claims shall cover universal joints of the character with which the invention is concerned made up in accordance with the general steps enumerated herein.

What I claim is:

1. A universal joint of hyperbolic form having circular flanges for connection, respectively, to driving and driven members and composed of sheets of cord fabric cut on the bias and laid up with the main strands extending in parallelism in opposite directions and crossing, respectively, at points between the driving and driven members, and a carrier of rubber of hyperbolic form in which said sheets are embedded.

2. A universal joint of hyperbolic form having circular flanges for connection, respectively, to driving and driven members and composed of sheets of cord fabric cut on the bias and laid up with the main strands extending in parallelism in opposite directions and crossing respectively, at points between the driving and driven members, a carrier of rubber of hyperbolic form in which said sheets are embedded, and circular metal beads embedded in said flanges, respectively.

3. A universal joint of hyperbolic form having circular flanges for connection, respectively, to driving and driven members and composed of sheets of cord fabric cut on the bias and laid up with the main strands extending in parallelism in opposite directions and crossing, respectively, at points between the driving and driven members, and a carrier moulded of relatively tough rubber to form said flanges and of relatively soft gum rubber at the mid-section of the joint to embed completely all of said sheets.

This specification signed this 13th day of June A. D. 1923.

AUGUST H. LEIPERT.